(12) United States Patent
Nissilä

(10) Patent No.: US 6,684,713 B2
(45) Date of Patent: Feb. 3, 2004

(54) MEASURING FORCE TRANSMITTED BY FORCE TRANSMISSION EQUIPMENT

(75) Inventor: Seppo Nissilä, Oulu (FI)

(73) Assignee: Polar Electro Oy, Kemple (FI)

( * ) Notice: Subject to any disclaimer, the term of this patent is extended or adjusted under 35 U.S.C. 154(b) by 0 days.

(21) Appl. No.: 09/932,470

(22) Filed: Aug. 17, 2001

(65) Prior Publication Data

US 2002/0023494 A1 Feb. 28, 2002

(30) Foreign Application Priority Data

Aug. 25, 2000 (FI) .............................. 20001880

(51) Int. Cl.$^7$ ................................ G01L 1/14
(52) U.S. Cl. ...................... 73/775; 73/780; 73/828; 73/862.626
(58) Field of Search .............. 73/581, 862.41, 73/862.473, 862.59, 862.626, 780, 781, 769, 828, 775, 779

(56) References Cited

U.S. PATENT DOCUMENTS 4,114,428 A * 9/1978 Popenoe ...................... 73/761
4,312,001 A * 1/1982 Marzolf .................. 340/870.16
4,637,265 A * 1/1987 Fiori, Jr. ................. 73/862.331
5,027,303 A * 6/1991 Witte ............................ 702/44
5,297,439 A * 3/1994 Tyren et al. .................. 73/779
5,581,248 A * 12/1996 Spillman et al. ........ 340/870.31
6,199,021 B1 * 3/2001 Cote et al. ..................... 702/44

FOREIGN PATENT DOCUMENTS

| EP | 0 772 034 A1 | 7/1997 |
| EP | 0 909 940 A2 | 4/1999 |

\* cited by examiner

Primary Examiner—Hezron Williams
Assistant Examiner—John Hanley
(74) Attorney, Agent, or Firm—Hoffmann & Baron, LLP

(57) ABSTRACT

A bicycle which comprises as force transmission equipment a chain for transmitting the muscular strength of a person pedaling the bicycle from the person to the bicycle for the purpose of moving the bicycle, characterized in that the chain has a vibration transducer which is arranged to vibrate at a resonance frequency proportional to the force transmitted by the chain, and the bicycle comprises a reading device separate from the chain for reading the resonance frequency of the vibration transducer, to which reading device calculation means are connected for calculating the force affecting the chain on the basis of the resonance frequency.

17 Claims, 3 Drawing Sheets

MEASURING FORCE TRANSMITTED BY FORCE TRANSMISSION EQUIPMENT

FIELD OF THE INVENTION

The field of application of the invention is the measurement of force transmitted by force transmission equipment. The force transmission equipment is preferably a bicycle chain, in which case the invention measures the force exerted by a bicyclist through pedals to the chain.

BRIEF DESCRIPTION OF THE RELATED ART

The measurement of the force exerted by a bicyclist to a bicycle during pedaling is an interesting field of application for both an occasional bicyclist and an active sports enthusiast. By means of the measurement results, it is, among other things, possible to obtain information on the cycling technique of the bicyclist and to observe the strain of the cycling performance and through this, to plan the ratio between the exercise and the strain. The definition of cycling power and strength is further advantageous for instance for long-lasting exercises aimed at losing weight, in which case the fitness enthusiast tries to perform the fitness performance at a power level below a certain threshold value. The measurement of the force transmitted by the chain is further an important field of application for instance in motorcycles, in which case it is possible by means of the force transmitted by the chain to estimate the motor load, fuel consumption and mechanical wear.

In prior art solutions, the force of the force transmission equipment, such as a chain, has been measured using a method, in which the force has been estimated utilizing the mechanical vibration of the chain caused by the movement of the bicycle, the vibration being generated to the chain for instance by the friction between the chain and cogwheels and the roughness of the cycling surface. It is clear that the prior art solution for defining the force transmission equipment vibration and, further, the force is inaccurate, since the measurement is done indirectly and in a unit separate from the chain.

SUMMARY OF THE INVENTION

It is an object of the invention to implement an improved method and an apparatus implementing the method for measuring the force transmitted by force transmission equipment, i.e. the tensile stress affecting the force transmission equipment. This object is achieved by the method described in the following. It is a method for measuring the force transmitted by force transmission equipment, in which method the force transmission equipment is arranged to be a closed loop so that it is connected to a first turning means and from the first turning means to a separate second turning means, and the turning of the first turning means by a power source causes force to transmit by means of the force transmission equipment to the second turning means, turning the second turning means in the same direction as the first turning means. In the method, a reading device separate from the force transmission equipment reads the resonance frequency of a vibration transducer in the force transmission equipment, the resonance frequency being dependent on the level of the force transmitted by the force transmission equipment, and on the basis of the read resonance frequency, calculation means connected to the reading device calculate the force transmitted by the force transmission equipment.

The invention also relates to an arrangement for measuring the force transmitted by force transmission equipment, comprising force transmission equipment in a closed loop and a first turning means connected to the force transmission equipment and a second turning means separate from the first turning means and connected to the force transmission equipment, the turning of the first turning means by a power source causing force to transmit by means of the force transmission equipment to the second turning means, turning the second turning means in the same direction as the first turning means. The force transmission equipment comprises a vibration transducer for establishing a resonance frequency proportional to the force transmitted by the force transmission equipment, and the arrangement comprises a reading device structurally separate from the force transmission equipment for reading the resonance frequency of the vibration transducer, and the arrangement further comprises calculation means connected to the reading device for calculating the force transmitted by the force transmission equipment on the basis of the resonance frequency of the vibration transducer.

The invention also relates to a bicycle which comprises as its force transmission equipment a chain for transmitting the muscular strength of the person pedaling the bicycle from the person to the bicycle to move the bicycle. The bicycle chain has a vibration transducer which is arranged to vibrate at a resonance frequency proportional to the force transmitted by the chain, and the bicycle comprises a reading device separate from the chain for reading the resonance frequency of the vibration transducer, and calculation means connected to the reading device calculate the force affecting the chain on the basis of the resonance frequency.

The invention also relates to a vibration transducer for use in measuring the tensile stress transmitted by force transmission equipment. The vibration transducer intended to be fastened to the force transmission equipment is arranged to receive an electromagnetic excitation and to vibrate at a resonance frequency proportional to the tensile stress affecting the force transmission equipment, the resonance frequency being wirelessly readable for use in calculating the tensile stress transmitted by the force transmission equipment.

Preferred embodiments of the invention are disclosed in the dependent claims.

The invention thus relates to a method and apparatus for measuring the force transmitted by force transmission equipment. The force transmission equipment is arranged in a closed loop. In the description of the invention, force transmission equipment preferably refers to a chain of a bicycle, tricycle, motorcycle or the like. The arrangement of the invention comprises a first turning means and a second turning means separate from the first turning means and connected to the force transmission equipment. A turning means refers preferably to a cogwheel to which the chain can be connected. The forward turning means is then a forward cogwheel to which the bicycle pedals are connected and the second turning means is a cogwheel of the rear wheel. Turning the first turning means by a power source causes force to transmit by means of the force transmission equipment to the second turning means, turning the second turning means in the same direction as the first turning means, i.e. in the case of a bicycle, the force produced by a person through pedals is transmitted through the first cogwheel to the chain and on to the rear cogwheel and the rear wheel. In the solution of the invention, the force transmission equipment has a vibration transducer attached to it and arranged to establish a vibration signal proportional to the force transmitted by the force transmission equipment. The arrangement further comprises a reading device for reading the vibration signal of the vibration transducer proportional to the force as the vibration transducer passes by or through the reading device. In a preferred embodiment of the invention, the arrangement also calculates the power produced by the force transmission equipment by means of the measured force and the rate of movement or velocity of the force transmission equipment.

In a preferred embodiment of the invention, the force transmission equipment is a chain comprising chain pieces, the invention being in no way restricted to the number of the chain pieces. The structure of a chain piece is as known and comprises side plates and axle openings at both ends of the side plates. The chain pieces can be connected to each other by means of axle pins placed in the axle openings in such a manner that the first and second end of each chain piece is connected to different chain pieces. In a preferred embodiment, the vibration transducer measuring the vibration of the chain is located in the axle pin. According to another preferred embodiment, the vibration transducer is located in the side plate of the chain piece. The vibration transducer is preferably electrically insulated from the metal chain for instance by making the chain piece, which comprises the vibration transducer, of carbon fibber resin, ceramics or plastic.

In a preferred embodiment of the invention, the vibration transducer is a resonance circuit implemented as a coil capacitor circuit (LC circuit), for instance. According to a preferred embodiment of the invention, the coil is wound around the side plate of an extension piece and the capacitor is placed close to the coil, in the side plate, for instance. The resonance frequency of the vibration transducer then changes as a function of the force affecting the force transmission equipment because of the change in the capacitor capacitance and/or coil inductance of the resonance circuit. The arrangement for measuring the force of the chain further comprises a reading device, which is structurally, i.e. physically, separate from the force transmission equipment and which is connected to the vibration transducer through an electromagnetic connection for the purpose of reading the resonance/vibration frequency of the vibration transducer. The reading device comprises transmission means for transmitting an electromagnetic excitation to the vibration transducer and reception means for reading the resonance frequency of the vibration transducer. Said means are preferably implemented as coils, whereby the transmission coil oscillates in wide-band thus finding for the vibration transducer a resonance frequency proportional to the force and characteristic to that particular moment, while the reception coil reads the frequency in question. Said properties of the reading device can naturally also be implemented using one coil. The arrangement further comprises calculation means connected to the reading device for establishing from the resonance frequency read by the reading device the tensile stress exerted to the force transmission equipment. In the case of a bicycle, for instance, the reading device is located in the bicycle frame, whereby the vibration transducer and reading device can interact electromagnetically when the vibration transducer passes by or through the reading device.

The method of the invention defines the steps by which the force transmitted by the arrangement of the invention described above is measured.

The invention provides the advantage that the measuring arrangement is simple and thus also easy to install and inexpensive to manufacture in large series. The apparatus according to the method also provides an accurate force and power measurement, when the measurement is made by means of a vibration transducer in a chain.

BRIEF DESCRIPTION OF THE DRAWINGS

In the following, the invention will be described in more detail with reference to the attached drawings, in which.

DETAILED DESCRIPTION OF THE PREFERRED EMBODIMENTS

Figure 1:
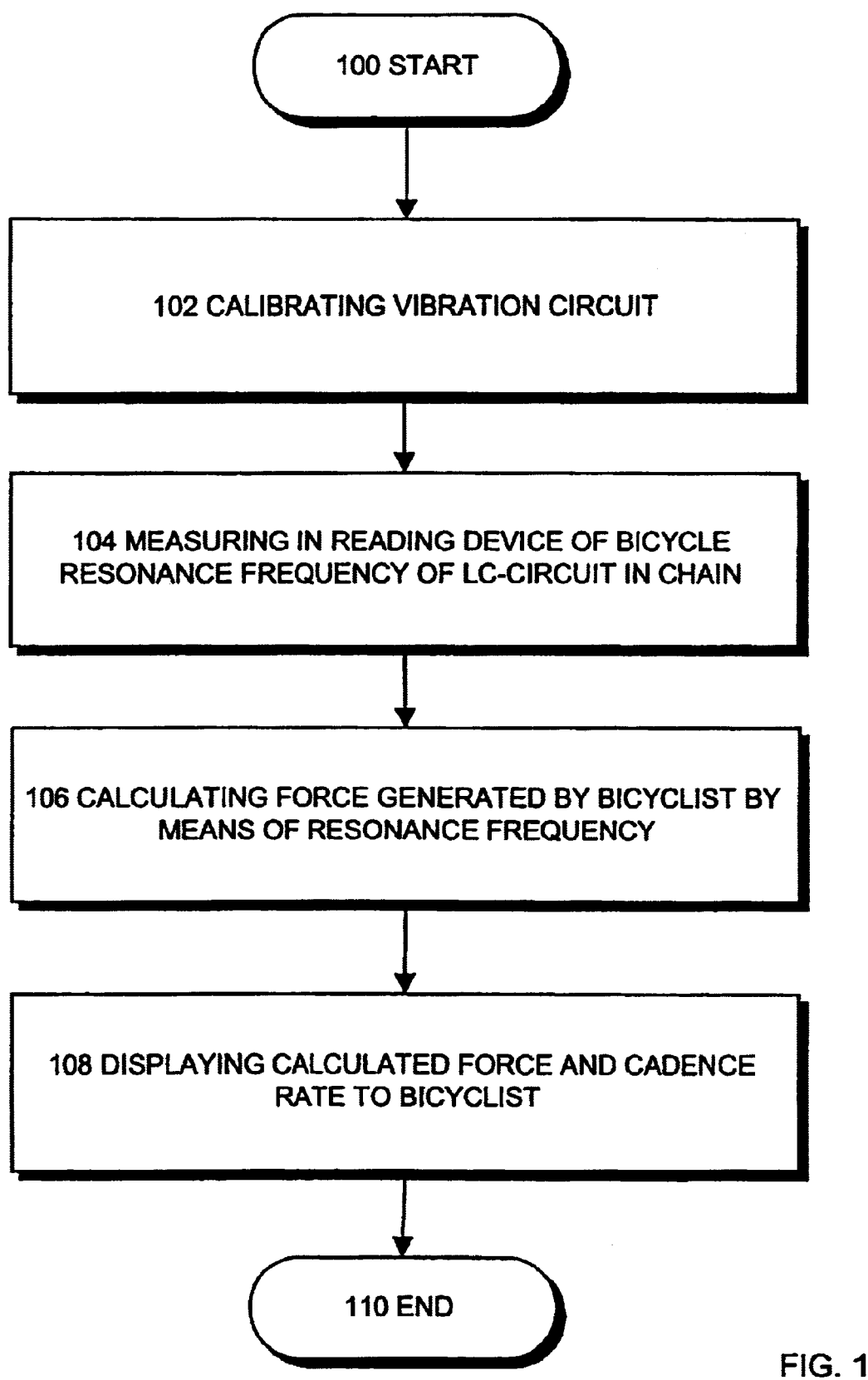
FIG. 1 shows an embodiment of the method of the invention.

In the following, the invention will be described by means of some preferred embodiments with reference to the attached FIGS. 1 to 4. FIG. 1 illustrates a preferred embodiment of the method of the invention. In the starting step 100, at least one vibration transducer is installed to a bicycle chain. It is clear that more than one vibration transducer can also be installed to the chain, whereby the force and power measurement can be made more than once during a cycle of the chain. A reading device for reading the vibration signal of the vibration transducer is located in the bicycle frame close to the chain for instance to a location where the chain piece comprising the vibration transducer is at its highest point. The reading device can also be fastened to the bicycle in such a manner, for instance, that the reading device surrounds the chain and the transducer passes through the reading device during a reading. The reading device activates the vibration transducer to vibrate at a resonance frequency which is proportional to the force exerted to the chain by a person through pedals. The resonance frequency to be measured is dependent on the longitudinal force exerted to the chain. In the prior art solution, the calculation of the force is based on mechanical vibration perpendicular to the longitudinal direction of the chain.

Before starting, the vibration circuit is preferably calibrated according to step 102. The calibration is done to the vibration circuit, because the chain piece in which the vibration circuit is located is affected, among other things, by a possible stretch occurred during the previous time of use and especially the temperature at the time of measurement. Calibration is performed for instance in such a manner that the vibration transducer is brought close to the reading device at such a time when the bicycle is not pedaled or alternatively, when it is pedaled at a minimum force. This way, a reference frequency is obtained, i.e. a vibration frequency of the vibration transducer at a minor force or without a force exerted to the chain at the temperature prevailing at the time of measurement.

In step 104, the pedaling person exerts to the bicycle pedals a force which is transmitted through the pedals and their cranks to the chain. At least one vibration transducer is fastened to the chain, which always when passing the reading device in the frame receives from the reading device an excitation, as a result of which the vibration transducer indicates its resonance frequency to the reading device. The interaction between the reading device and the vibration transducer is electromagnetic, for instance, in which case the arrival of the transducer in the electromagnetic field of the reading device generates an electric current in the transducer. In a preferred embodiment of the invention, the transducer is a resonance circuit made up by a coil and capacitor, and the reading device induces to the vibration transducer a resonating electric current, the frequency of which can correspondingly be read by the reading device. In step 106, the force produced by the bicyclist is established from the read resonance frequency. The calculation is, for instance, done in a unit which is separate from the reading device and which can be fastened to the bicycle or the wrist of the bicyclist, for instance. Information is transferred to the calculation means through a connecting line or wirelessly, for instance. Display means, such as a liquid crystal display, are preferably connected to the calculation means for the purpose of displaying information according to step 108. The information to be displayed comprises not only the measured force, but also for instance the speed of the bicycle, which can easily be calculated by the times that the vibration transducer passes the reading device. It is clear that from the above-mentioned variables, several variables can be derived, calculated by the calculation means and displayed on the display. In a preferred embodiment of the invention, the power exerted by the pedaling person to the bicycle is calculated from the measured force and the noted chain speed by multiplying the force by the speed. Other possible variables include a moving average of the force exerted by the bicyclist to the bicycle, maximum/minimum forces or another corresponding variable. It is clear that the above-mentioned variables, such as force, can also be calculated as a moving average of ten last measurements, for instance, and not on the basis of the last measured value.

Figure 2:
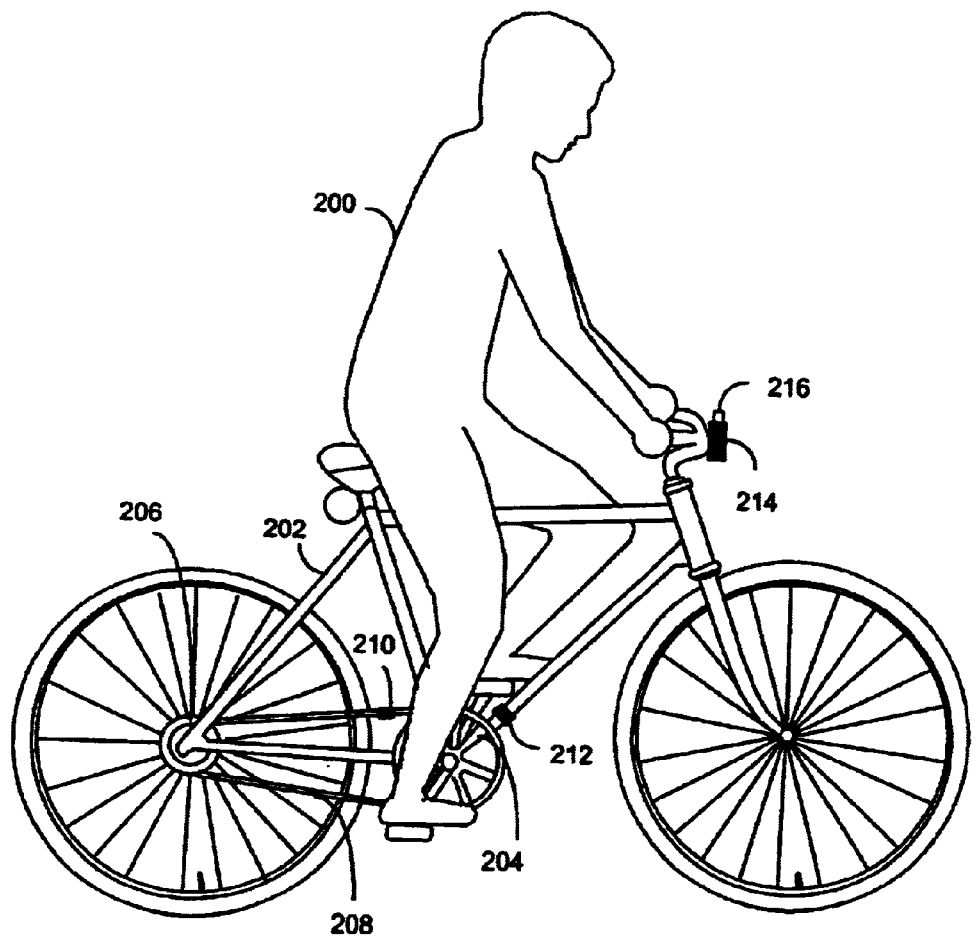
FIG. 2 shows a solution of the invention arranged in a bicycle.

FIG. 2 shows an embodiment of the apparatus of the invention in general. The figure shows a bicyclist 200 pedaling a bicycle 202 and producing a force to be measured. The bicycle 202 comprises a first turning means 204 and a second turning means 206 separate from it, which are connected to each other by means of force transmission equipment 208. The first turning means 204 is, in the case of a bicycle, preferably a cogwheel, the turning of which is caused by the bicyclist through pedals and pedal cranks. The second turning means is preferably also a cogwheel which is connected to a chain 208 obtaining its turning force from it. A vibration transducer 210, of which there may be several in the chain 208, is connected to the force transmission equipment, i.e. chain, 208. The force affecting the chain 208 is at its maximum when the pedals are at the same horizontal level with each other, and at its minimum when one pedal is at its high position and the other at its low position. The vibration transducer 210 can thus be located with respect to a reading device 212 in such a manner, for instance, that the pedals are at a 45 degree angle to the horizontal, whereby the average force affecting the chain 208 can be measured. By placing several vibration transducers in the chain 208, it is possible to measure for instance the minimum or maximum force exerted by the bicyclist to the chain or the forces produced by the left or right foot. This way, it is possible to guide the person pedaling to an optimal bicycling performance, in which the force and power produced by both feet are substantially equal.

The bicycle 202 has a reading device 212 close to the chain 208 and when the vibration transducer 210 comes close to the reading device 212, it enters an electromagnetic field of the reading device 212. The resonance frequency of the vibration transducer 210 is thus read inductively by the reading device 212, i.e. they are not in physical contact with each other. The reading device 212 can be integrated during manufacturing as part of the bicycle 202 or it can be detachably attached to different locations on the bicycle 202. The bicycle 202 further has calculation means 214 which, like the reading device 212, are either integrated as part of the bicycle 202 or can be detachably attached to a desired location on the bicycle 202. The calculation means 214 are connected to the reading device 212 through a connecting line or wirelessly and the force produced by the pedaling person 200 to the chain 208 is calculated from the vibration information obtained from the reading device 212. The force information and any other information is displayed to the person 200 on a display 216. It is clear that the above-mentioned calculation means 214 and display 216 can also reside physically in the same unit as the reading device 212. In the measuring arrangement described above, the calculation means 214 and the display 216 are not necessary, but the information can also be examined later by storing the information in memory and processing it later with an external computer, for instance. The information can be transferred to the computer using prior art, for instance wirelessly.

It is clear that the bicycle 202 in FIG. 2 is only an example of the bicycle 202 and in practice, the bicycle 202 often has more than one gear. During shift of gears, the chain 208 may move horizontally or vertically, which should be taken into consideration in the placement and design of the reading device 212 so that the vibration transducer 210 can be read on all gears. This can be achieved for instance by placing the reading device 212 to the gear-shifter or by making the reading field of the reading device 212 so large that the vibration transducer 210 always comes within its range.

Figure 3A:
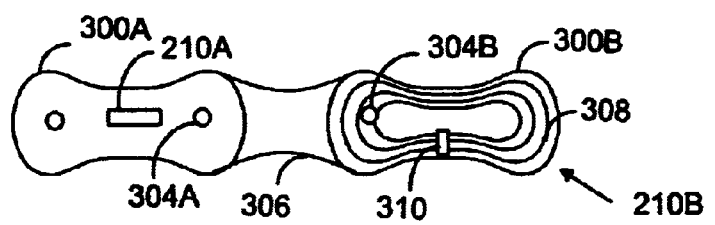
FIG. 3A shows a location of the vibration transducer of the invention.

FIG. 3A describes chain pieces 300A, 300B of the invention by means of two preferred embodiments. A In a first embodiment shown in FIG. 3A, a vibration transducer 210A is fastened to a side plate of the chain piece 300A. The fastening to the side plate can be done with glue, for instance. The transducer 210A is in said case implemented as a capacitor, for instance, the capacitance of which changes as a function of the force stretching the chain. In a second embodiment shown in FIG. 3A, in the chain piece 300B, a coil 308 is wound around the side plate of the chain piece 300B in longitudinal direction and a capacitor 310 is in the side plate close to the coil. In this second embodiment, the resonance frequency of a transducer 210B changes due to the tensile stress directed to it. At the location of a measuring coil in a reading device 212, the transducer receives an electromagnetic excitation which makes the transducer vibrate at a frequency proportional to the force that can be detected by the reading device 212.

Figure 3B:
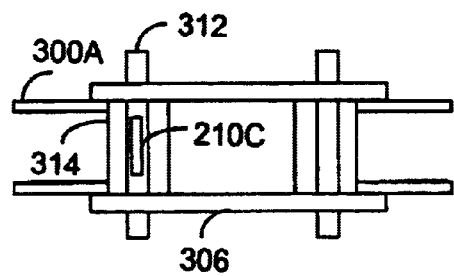
FIG. 3B shows a location of the vibration transducer of the invention.

The chain pieces 300A, 300B are connected to each other by means of a connecting piece 306 in such a manner that axle pins are placed in an axle opening 304A of the chain piece 300A and an axle opening 304B of the chain piece 300B. In FIG. 3A, for instance, the dimensions of the chain pieces 300A, 300B are such that the size of the axle opening is 3 mm, its horizontal length is 20 mm, its height at the narrowest point is 4 mm and at the widest point is 8 mm. The length of the axle pin is 10 mm, for instance. The measured force is for instance defined at a scale of 10 N to 5000 N with a resolution of 10 N. The operating temperature can be defined to be between (−20 C.) to (+80 C.). The chain used in power calculation is, in practice, in the range of 0 to 2 m/s. The chain pieces 300A, 300B comprising the vibration transducers 210A, 210B, 210C are preferably made of an insulating material, for instance carbon fiber resin. Further, said chain piece is preferably technically manufactured in such a manner that the coil and/or capacitor in it are protected against mechanical wear and moisture. FIG. 3B shows the essential parts of the chain piece structure in a third embodiment. In the solution of FIG. 3B, a vibration transducer 210C is placed inside an axle pin 312. The axle pin 312 is surrounded by a reinforcement 310 314 which is a metal cylinder, for instance.

Figure 4:
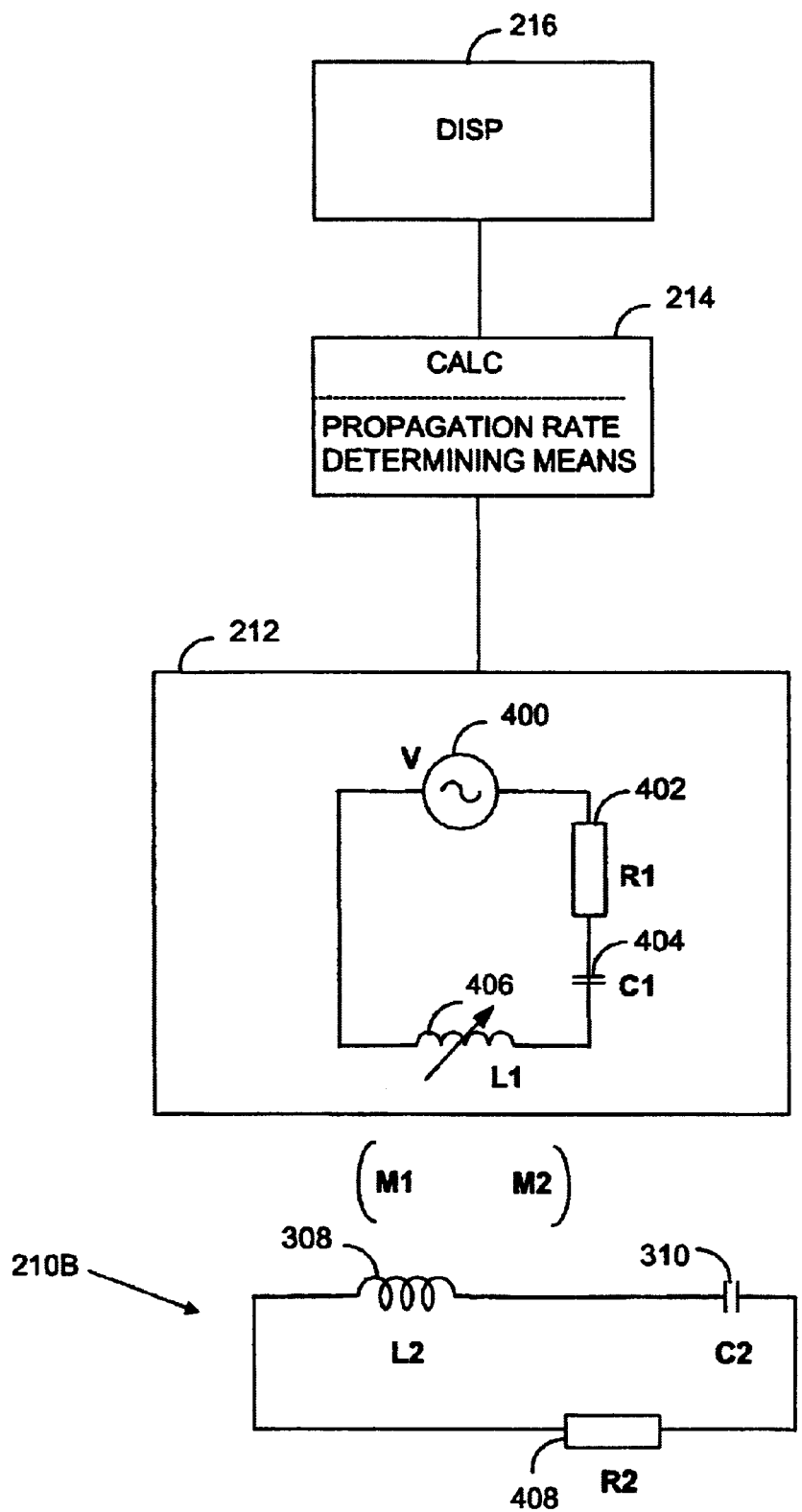
FIG. 4 shows a solution of the equipment arrangement of an embodiment of the invention.

FIG. 4 shows an equipment arrangement according to an embodiment of the invention, for implementing the method of the invention. The reading device 212 is, for instance, an electronic circuit which comprises an alternating-current source 400 and an adjustable coil (L1) 406 and capacitor (C1) 404 connected to it. The resistor of the circuit is shown as R1 402. The vibration transducer 210B is preferably an LC circuit, i.e. a resonance circuit formed by a coil (L2) 308 and capacitor (C2) 310. The resistor of the vibration transducer is shown as R2 408. In a solution according to an embodiment of the invention, a transmitter coil 406 of the reading device 212 oscillates in wide-band covering the range of the resonance frequency caused by the force and temperature of the vibration transducer 210B. The resonance frequency proportional to the force of the vibration transducer 210 changes with changes in the capacitor 310 capacitance and/or coil 308 inductance. To make the calculation easier, the vibration transducer is preferably such that a linear dependency prevails between the force and the resonance frequency.

Technically, the reading device is implemented in such a manner for instance that changes are observed in the voltage of the reading device electric circuit, which are caused by changes in the circuit impedance. The impedance formed by components 402 to 406 of the circuit and the impedance caused by the vibration transducer 210B affect the impedance of the reading device 212 circuit. When the vibration transducer 210B is brought close to or inside the reading device 212, the impedance of the reading device 212 changes, which causes a change in resonance frequency and voltage that can be read by the reading device 212. The force affecting the vibration transducer 210B can be calculated by the change in impedance, voltage, and thus resonance frequency in the reading device 212. The volume of the coil 308 of the vibration transducer 210B is for instance (1*4*5) mm$^3$ while the volume of the coil 406 of the reading device 212 is for instance (20*20*50) mm$^3$, i.e. the coil 308 of the vibration transducer 210B is significantly smaller than the coil 406 of the reading device 212. The inductance of the coil 308 used in the vibration transducer 210B is for instance 200 nH and the capacitance of the capacitor 310 is 330 pF. The rate of movement or velocity of the transducer 210B can easily be determined by means of the length of the coil 406 in the reading device and the time for magnetic interaction between the coils. By means of the measured force and the rate of movement or velocity of the force transmission equipment, the power transmitted by the force transmission equipment can be calculated from the formula power (P)= force (F)*velocity (v). When the length of the transducer coil 210B is small in comparison with the coil 406 of the reading device 212, the impulse response to be measured is nearly a rectangular pulse, the amplitude of which is the voltage change measured in the reading device 212.

The reading device 212 is connected to calculation means 214 which calculate variables, such as force, cadence rate and power measured by the reading device. The calculation means 214 are preferably implemented by program, as ASIC, by separate logic components or in a corresponding manner. The calculation unit 214 is preferably connected to a display 216 for the purpose of displaying the variables calculated in the calculation unit. The display can be a liquid crystal display, for instance.

Even though the invention has been explained in the above with reference to examples in accordance with the attached drawings, it is obvious that the invention is not restricted to them but can be modified in many ways within the scope of the inventive idea disclosed in the attached claims.

What is claimed is:

1. A vibration transducer for use in measuring the tensile stress transmitted by force transmission equipment, wherein the vibration transducer intended to be fastened to the force transmission equipment is arranged to receive an electromagnetic excitation and to vibrate at a resonance frequency proportional to the tensile stress affecting the force transmission equipment, the resonance frequency being wirelessly readable for use in calculating the tensile stress transmitted by the force transmission equipment, the force transmission equipment being a bicycle chain, the chain comprising chain pieces which are connected to each other by axle pins, the vibration transducer being at least one of located in an axle pin and fastened to a side plate of a chain piece, the vibration transducer vibrating at a resonance frequency proportional to the tensile stress transmitted by the chain.

2. A vibration transducer as claimed in claim 1, wherein the vibration transducer is a coil capacitor circuit.

3. A method for measuring the force transmitted by force transmission equipment, in which method the force transmission equipment is arranged to be a closed loop so that it is connected to a first turning means and from the first turning means to a separate second turning means, and the turning of the first turning means by a power source causes force to transmit by means of the force transmission equipment to the second turning means, turning the second turning means in the same direction as the first turning means, comprising the steps of reading with a reading device separate from the force transmission equipment the resonance frequency of a vibration transducer in the force transmission equipment, the resonance frequency being dependent on the level of the force transmitted by the force transmission equipment, and calculating with calculation means connected to the reading device on the basis of the resonance frequency the force transmitted by the force transmission equipment, an electromagnetic excitation being transmitted from the reading device to make the vibration transducer vibrate at a resonance frequency proportional to the force transmitted by the force transmission equipment and the resonance frequency of the vibration transducer being read wirelessly by the reading device for the purpose of using it in calculating the force transmitted by the force transmission equipment, the force transmission equipment being a bicycle chain, the chain comprising chain pieces which are connected to each other in a closed loop by axle pins, the vibration transducer being located in at least one of an axle pin and a side plate of a chain piece of the chain.

4. A method as claimed in claim 3, wherein the vibration transducer is a coil capacitor circuit.

5. A method as claimed in claim 3, wherein a velocity of the vibration transducer is measured in relation to the reading device.

6. A method as claimed in claim 5, wherein the power transmitted by the force transmission equipment is established by means of the velocity and the force transmitted by the force transmission equipment.

7. A method as claimed in claim 3, wherein the force transmitted by a bicycle chain is measured and the reading device is located on a bicycle so that the vibration transducer fastened to the bicycle chain runs past or through the reading device so as to make the resonance frequency of the vibration transducer readable by the reading device.

8. An arrangement for measuring the force transmitted by force transmission equipment, comprising force transmission equipment in a closed loop and a first turning means connected to the force transmission equipment and a second turning means separate from the first turning means and connected to the force transmission equipment, the turning of the first turning means by a power source causing force to transmit by means of the force transmission equipment to the second turning means, turning the second turning means in the same direction as the first turning means, a vibration transducer for establishing a resonance frequency proportional to the force transmitted by the force transmission equipment, and the arrangement comprises a reading device structurally separate from the force transmission equipment for reading the resonance frequency of the vibration transducer, and the arrangement further comprises calculation means connected to the reading device for calculating the force transmitted by the force transmission equipment on the basis of the resonance frequency of the vibration transducer, the reading device in the arrangement being arranged to generate an electromagnetic excitation to make the vibration transducer vibrate at a resonance frequency, the reading device being further arranged to wirelessly receive an electromagnetic response corresponding to the resonance frequency of the vibration transducer, the force transmission equipment being a bicycle chain, the chain comprising chain pieces, extension pieces of the chain being connected by axle pins of the chain, the vibration transducer being located in at least one of an axle pin and a side plate of a chain piece of the chain.

9. An arrangement as claimed in claim 8, wherein the reading device is arranged to measure a velocity of the vibration transducer in relation to the reading device.

10. An arrangement as claimed in claim 9, wherein a calculation unit is arranged to calculate the power transmitted by the force transmission equipment by means of the velocity of the vibration transducer and the force transmitted by the force transmission equipment.

11. An arrangement as claimed in claim 8, wherein the reading device is located on a bicycle being subjected to force measurement so that the vibration transducer fastened to a chain of the bicycle can be read by the reading device when the vibration transducer passes by or through the reading device.

12. An arrangement as claimed in claim 8, wherein the vibration transducer is a coil capacitor circuit.

13. A bicycle which comprises as force transmission equipment a chain for transmitting the muscular strength of a person pedaling the bicycle from the person to the bicycle for the purpose of moving the bicycle, wherein the chain has a vibration transducer which is arranged to vibrate at a resonance frequency proportional to the force transmitted by the chain, and the bicycle comprises a reading device separate from the chain for reading the resonance frequency of the vibration transducer, to which reading device calculation means are connected for calculating the force affecting the chain on the basis of the resonance frequency, the reading device being arranged to generate an electromagnetic excitation to make the vibration transducer vibrate at a resonance frequency proportional to the force transmitted by the force transmission equipment, the reading device being further arranged to wirelessly read the resonance frequency of the vibration transducer, the chain comprising chain pieces which are connected to each other by axle pins, the vibration transducer being located in at least one of an axle pin and a side plate of a chain piece.

14. A bicycle as claimed in claim 13, wherein the vibration transducer is a coil capacitor circuit.

15. A bicycle as claimed in claim 13, wherein the reading device is arranged to measure the velocity of the vibration transducer in relation to the reading device.

16. A bicycle as claimed in claim 15, wherein a calculation unit is arranged to establish the power transmitted by the chain by means of the velocity and the force transmitted by the chain.

17. A bicycle as claimed in claim 13, wherein the reading device is located on the bicycle so that the vibration transducer fastened to the chain can be read by the reading device when the vibration transducer passes by or through the reading device.

* * * * *